United States Patent
Kodama et al.

(10) Patent No.: US 9,266,522 B2
(45) Date of Patent: Feb. 23, 2016

(54) DRIVING FORCE TRANSMISSION CONTROLLER AND VEHICLE CONTROL METHOD

(71) Applicant: JTEKT CORPORATION, Osaka-shi (JP)

(72) Inventors: Akira Kodama, Chiryu (JP); Kenta Taniguchi, Anjo (JP)

(73) Assignee: JTEKT CORPORATION, Osaka-shi (JP)

(*) Notice: Subject to any disclaimer, the term of this patent is extended or adjusted under 35 U.S.C. 154(b) by 14 days.

(21) Appl. No.: 14/334,093

(22) Filed: Jul. 17, 2014

(65) Prior Publication Data
US 2015/0032335 A1 Jan. 29, 2015

(30) Foreign Application Priority Data

Jul. 23, 2013 (JP) ................................. 2013-152816

(51) Int. Cl.
| | |
|---|---|
| *A01B 69/00* | (2006.01) |
| *B60W 10/20* | (2006.01) |
| *B60W 10/04* | (2006.01) |
| *B60W 10/10* | (2012.01) |
| *B60K 17/35* | (2006.01) |
| *B60W 30/02* | (2012.01) |

(52) U.S. Cl.
CPC ............ *B60W 10/20* (2013.01); *B60K 17/3515* (2013.01); *B60W 10/04* (2013.01); *B60W 10/10* (2013.01); *B60W 30/02* (2013.01);
(Continued)

(58) Field of Classification Search
CPC ..... B60W 10/20; B60W 10/04; B60W 10/10; B60W 17/3515; B60W 2510/207; B60W 30/02; B60W 2540/10; B60W 2720/406; B60G 2800/215; B60G 2800/922

USPC ......... 701/36, 38, 42, 70, 41; 280/5.506, 5.51
See application file for complete search history.

(56) References Cited

U.S. PATENT DOCUMENTS

| | | | | |
|---|---|---|---|---|
| 5,087,068 A | * | 2/1992 | Fukanaga et al. .......... | 280/5.508 |
| 5,092,624 A | * | 3/1992 | Fukuyama et al. ........ | 280/5.506 |

(Continued)

FOREIGN PATENT DOCUMENTS

| | | |
|---|---|---|
| DE | 10 2010 026 4 | 1/2012 |
| EP | 1 627 763 A2 | 2/2006 |

(Continued)

OTHER PUBLICATIONS

Extended European Search Report issued Jan. 22, 2015 in Patent Application No. 14177765.6.

*Primary Examiner* — Gertrude Arthur Jeanglaude
(74) *Attorney, Agent, or Firm* — Oblon, McClelland, Maier & Neustadt, L.L.P.

(57) ABSTRACT

A driving force transmission controller includes: a normal turning control unit that computes command values such that driving force transmitted to an outer wheel in a turning direction is larger than that transmitted to an inner wheel during normal turning; a counter-steering control unit that computes the command values such that the driving force transmitted to the outer wheel is larger than that transmitted to the inner wheel during counter-steering; a counter-steering return control unit that corrects the command values such that a rate of change in each of the driving forces transmitted to the right and left rear wheels is lower than a rate of change in a steered angle of front wheels when a steering velocity is equal to or higher than a prescribed value during the counter-steering; and a driving force transmission control unit that controls a driving force transmission device based on the command values.

5 Claims, 9 Drawing Sheets

(52) U.S. Cl.
CPC ...... *B60G2800/215* (2013.01); *B60W 2510/20* (2013.01); *B60W 2510/207* (2013.01); *B60W 2540/10* (2013.01); *B60W 2720/406* (2013.01)

(56) References Cited

U.S. PATENT DOCUMENTS

| | | | |
|---|---|---|---|
| 5,170,969 A | * | 12/1992 | Lin .............................. 244/194 |
| 2005/0205339 A1 | | 9/2005 | Aizawa et al. |
| 2006/0041357 A1 | | 2/2006 | Mori |
| 2007/0106444 A1 | * | 5/2007 | Asano ............................ 701/70 |
| 2010/0121546 A1 | | 5/2010 | Ikushima et al. |

FOREIGN PATENT DOCUMENTS

| | | |
|---|---|---|
| EP | 1 627 764 A1 | 2/2006 |
| EP | 2 157 338 A1 | 2/2010 |
| JP | 10-16600 | 1/1998 |

* cited by examiner

DRIVING FORCE TRANSMISSION CONTROLLER AND VEHICLE CONTROL METHOD

INCORPORATION BY REFERENCE

The disclosure of Japanese Patent Application No. 2013-152816 filed on Jul. 23, 2013 including the specification, drawings and abstract, is incorporated herein by reference in its entirety.

BACKGROUND OF THE INVENTION

1. Field of the Invention

The invention relates to a driving force transmission controller and a vehicle control method.

2. Description of the Related Art

Conventionally, there has been known a driving force transmission controller that is mounted in a four-wheel-drive vehicle and that is able to control the amounts of driving forces to be transmitted to right and left wheels independently of each other. For example, Japanese Patent Application Publication No. 10-16600 (JP 10-16600 A) describes such a driving force transmission controller.

The driving force transmission controller described in JP 10-16600 A controls the amounts of driving forces to be transmitted to right and left wheels using a map for high road surface friction resistance and a map for low road surface friction resistance in a mutually complementary manner, depending on a road surface friction coefficient. According to JP 10-16600 A, when a vehicle is in a travelling state in which right and left front wheels, which serve as steered wheels, are steered in a direction opposite to the turning direction during quick turning (counter-steering state), the rotational speed difference between right and left rear wheels is limited on the basis of a lateral acceleration to enhance the turning performance during counter-steering.

However, when the counter-steering state ends and the vehicle is returned to a normal turning state, the details of the process of computing command values of the driving forces to be transmitted to the right and left wheels are changed and thus the driving forces transmitted to the right and left wheels may be rapidly changed. Thus, the vehicle behavior may be temporarily disordered depending on the travelling state of the vehicle.

SUMMARY OF THE INVENTION

One object of the invention is to provide a driving force transmission controller and a vehicle control method that make it possible to suppress disorder of the vehicle behavior during transition from the counter-steering state to the normal turning state.

An aspect of the invention relates to a driving force transmission controller includes: a normal turning control unit that computes driving force transmission command values such that driving force transmitted to an outer wheel in a turning direction, out of right and left rear wheels, is larger than driving force transmitted to an inner wheel in the turning direction, out of the right and left rear wheels, during normal turning in which a turning direction of a vehicle is the same as a steered direction of front wheels; a counter-steering control unit that estimates the turning direction based on a slip angle and computes the driving force transmission command values such that the driving force transmitted to the outer wheel in the estimated turning direction is larger than the driving force transmitted to the inner wheel in the estimated turning direction during counter-steering in which the turning direction of the vehicle is opposite to the steered direction of the front wheels; a counter-steering return control unit that corrects the driving force transmission command values such that a rate of change in each of the driving forces transmitted to the right and left rear wheels is lower than a rate of change in a steered angle of the front wheels when a steering wheel is operated in a returning direction at a velocity equal to or higher than a prescribed value during the counter-steering; and a driving force transmission control unit that controls a driving force transmission device to transmit driving force generated by a drive source of the vehicle to the right and left rear wheels such that a ratio between driving force transmitted to the right rear wheel and driving force transmitted to the left rear wheel is variable based on the driving force transmission command values.

Another aspect of the invention relates to a vehicle control method using a driving force transmission controller that controls a driving force transmission device that transmits driving force generated by a drive source of a vehicle to right and left rear wheels such that a ratio between driving force transmitted to the right rear wheel and driving force transmitted to the left rear wheel is variable. The vehicle control method includes: computing driving force transmission command values such that driving force transmitted to an outer wheel in a turning direction, out of the right and left rear wheels, is larger than driving force transmitted to an inner wheel in the turning direction, out of the right and left rear wheels, during normal turning in which a turning direction of the vehicle is the same as a steered direction of front wheels; estimating the turning direction based on a slip angle and computing the driving force transmission command values such that the driving force transmitted to the outer wheel in the estimated turning direction is larger than the driving force transmitted to the inner wheel in the turning direction during counter-steering in which the turning direction of the vehicle is opposite to the steered direction of the front wheels; correcting the driving force transmission command values such that a rate of change in each of the driving forces transmitted to the right and left rear wheels is lower than a rate of change in a steered angle of the front wheels when a steering wheel is operated in a returning direction at a velocity equal to or higher than a prescribed value during counter-steering; and controlling the driving force transmission device based on the driving force transmission command values.

According to the above aspects, it is possible to provide the driving force transmission controller and the vehicle control method that make it possible to suppress disorder of the vehicle behavior during transition from the counter-steering state to the normal turning state.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

Figure 1:
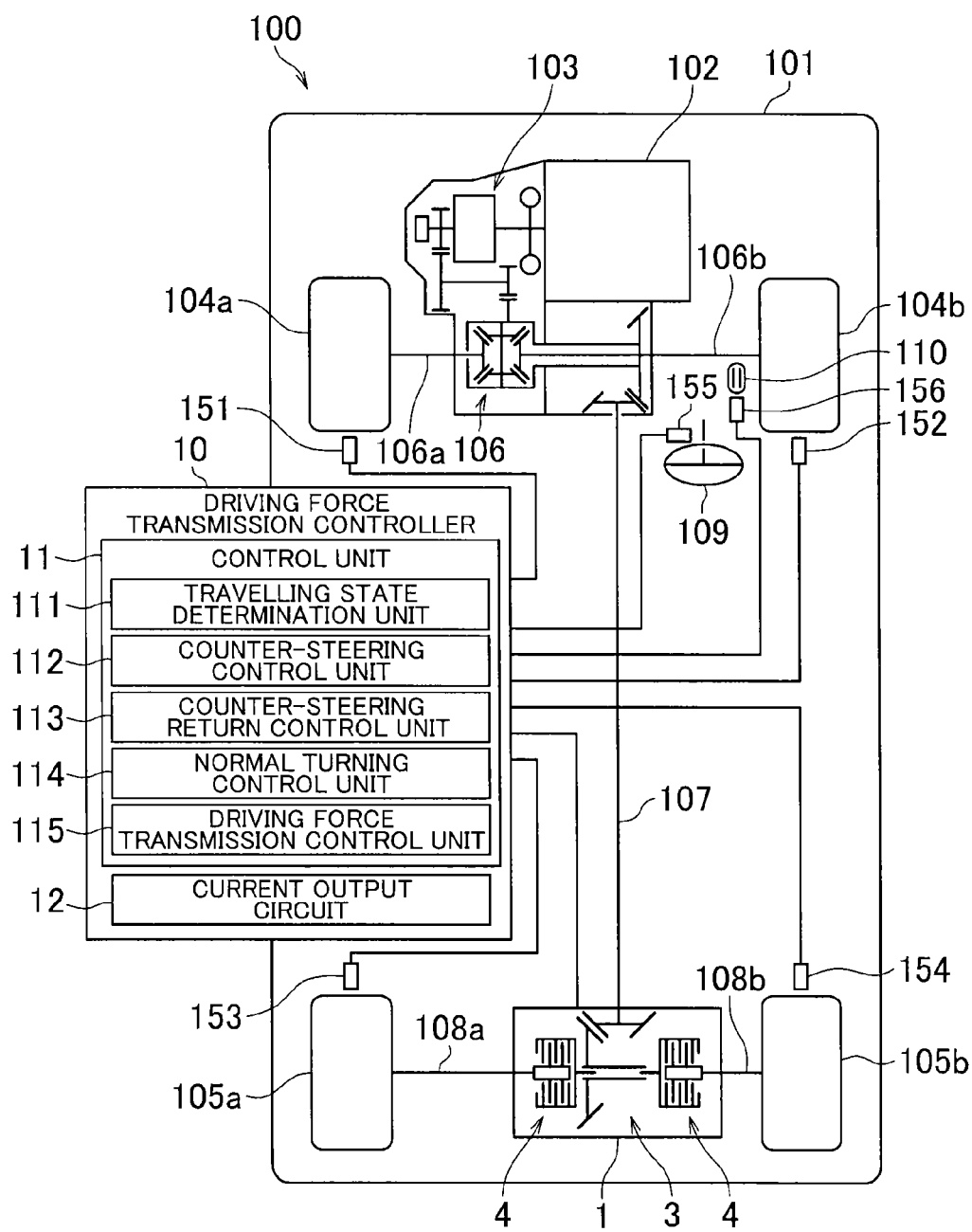
FIG. 1 is a diagram illustrating the schematic configuration of a four-wheel-drive vehicle according to an embodiment of the invention.

FIG. 1 is a diagram schematically illustrating the configuration of a four-wheel-drive vehicle according to an embodiment of the invention. As illustrated in FIG. 1, the four-wheel-drive vehicle 100 includes a vehicle body 101, an engine 102 that serves as a drive source that generates traction torque, a transmission 103, right and left front wheels 104b, 104a that serve as a pair of right and left main drive wheels to which driving force generated by the engine 102 is constantly transmitted, and right and left rear wheels 105b, 105a that serve as a pair of right and left auxiliary drive wheels to which the driving force generated by the engine 102 is transmitted on an intermittent basis depending on the vehicle travelling state.

The four-wheel-drive vehicle 100 includes, as a driving force transmission system, a front differential 106, a propeller shaft 107, a driving force transmission device 1, and a driving force transmission controller 10 that controls the driving forces to be transmitted to the right rear wheel 105b and the left rear wheel 105a independently of each other. The driving force generated by the engine 102 is constantly transmitted to the right and left front wheels 104b, 104a via the transmission 103 that performs speed change, the front differential 106 and a pair of drive shafts 106b, 106a. The right and left front wheels 104b, 104a serve as steered wheels that are turned relative to the vehicle body 101 by a driver's operation of a steering wheel 109.

The driving force generated by the engine 102 is transmitted to the right and left rear wheels 105b, 105a via the transmission 103 that performs speed change, the propeller shaft 107, the driving force transmission device 1, and a pair of drive shafts 108b, 108a. The driving force transmission device 1 is able to adjust the driving forces to be transmitted to the right rear wheel 105b and the left rear wheel 105a independently of each other. The configuration of the driving force transmission device 1 will be described later.

The driving force transmission controller 10 is connected to rotation speed sensors 152, 151, 154, 153 used to detect rotation speeds of the right and left front wheels 104b, 104a and the right and left rear wheels 105b, 105a. The rotation speed sensors 152, 151, 154, 153 are Hall ICs disposed to face magnetic rings each of which has multiple magnetic poles and which respectively rotate together with the right and left front wheels 104b, 104a and the right and left rear wheels 105b, 105a. The rotation speed sensors 151 to 154 each output a pulse signal in a cycle corresponding to the rotation speed. Thus, the driving force transmission controller 10 detects the rotation speeds of the right and left front wheels 104b, 104a and the right and left rear wheels 105b, 105a.

The driving force transmission controller 10 is connected to a steering angle sensor 155 that detects a rotation angle (steering angle θs) with respect to the neutral position of the steering wheel 109. Thus, the driving force transmission controller 10 detects the steering angle θs of the steering wheel 109.

The driving force transmission controller 10 is connected to an accelerator position sensor 156 that detects a depression amount of an accelerator pedal 110. Thus, the driving force transmission controller 10 detects an accelerator position corresponding to the depression amount of the accelerator pedal 110.

Figure 2:
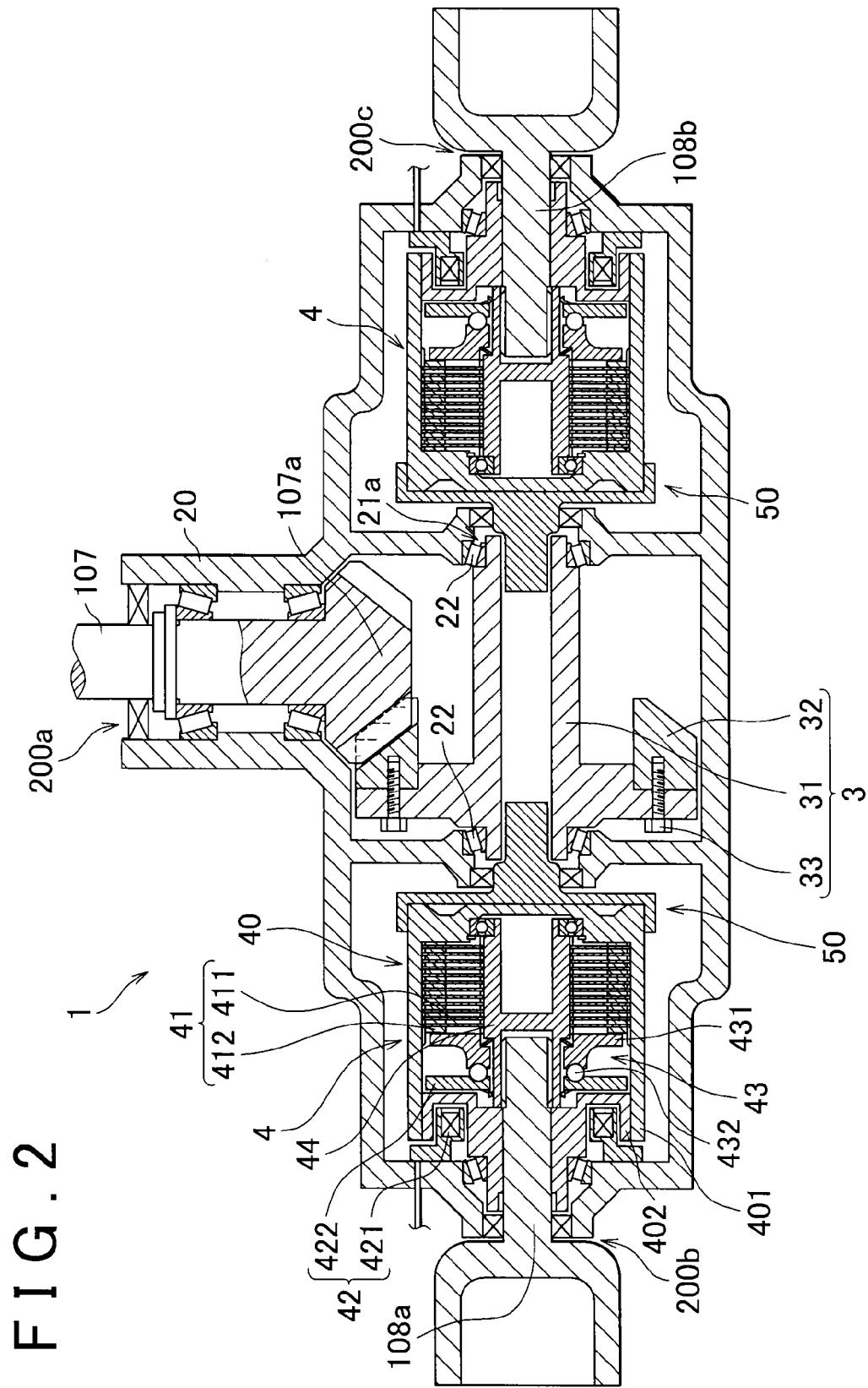
FIG. 2 is a sectional view illustrating an example of the configuration of a driving force transmission device.

FIG. 2 is a sectional view illustrating an example of the configuration of the driving force transmission device 1.

The driving force transmission device 1 includes a case member 20, and an input member 3 and a pair of torque couplings 4 that are accommodated in the case member 20. The driving force transmission device 1 transmits the driving force generated by the engine 102 to the right and left rear wheels 105b, 105a such that the ratio between the driving force transmitted to the right rear wheel 105b and the driving force transmitted to the left rear wheel 105a is variable.

The input member 3 includes a tubular first member 31 that is rotatably supported by the case member 20 and a second member 32 formed of an annular ring gear, and the first member 31 and the second member 32 are coupled to each other with multiple bolts 33. The second member 32 is meshed with a gear portion 107a formed at one end of the propeller shaft 107 passed through a first opening 200a of the case member 20. The first member 31 is rotatably supported by a pair of bearings 22 disposed between the inner face of the case member 20 and the first member 31.

Each torque coupling 4 includes a multi-disc clutch 41, an electromagnetic clutch 42, a cam mechanism 43, an inner shaft 44, and a housing 40 that accommodates these elements. The housing 40 includes a first housing member 401 and a second housing member 402 that are coupled to each other so as to be non-rotatable relative to each other. The first housing member 401 has a bottomed cylindrical shape, and the second housing member 402 is disposed to close an opening-side end portion of the first housing member 401.

The multi-disc clutch 41 is disposed between the first housing member 401 of the housing 40 and the cylindrical inner shaft 44. The multi-disc clutch 41 includes inner clutch plates 411 that are spline-engaged with the outer peripheral face of the inner shaft 44 so as to be non-rotatable relative to the inner shaft 44, and outer clutch plates 412 that are spline-engaged with the inner peripheral face of the first housing member 401 so as to be non-rotatable relative to the first housing member 401.

The electromagnetic clutch 42 has an annular coil 421 and an armature cam 422. In the electromagnetic clutch 42, the armature cam 422 is moved toward the coil 421 by electromagnetic force generated by the coil 421, so that the armature cam 422 is brought into friction sliding with the second housing member 402. The cam mechanism 43 includes the armature cam 422 that serves as a cam member, and includes a main cam 431 that is disposed next to the armature cam 422 along the rotation axis of the housing 40 and spherical cam followers 432 that is interposed between the main cam 431 and the armature cam 422. In the cam mechanism 43, the armature cam 422 receives rotative force from the housing 40 upon energization of the coil 421 and converts the rotative force into pressing force that is used as clutch force of the multi-disc clutch 41.

When the amount of current supplied to the coil 421 increases, the force of friction between the armature cam 422 and the second housing member 402 increases and the main cam 431 more strongly presses the multi-disc clutch 41. That is, the torque coupling 4 is able to variably control the pressing force of the multi-disc clutch 41 depending on the amount of current supplied to the coil 421, and is thus able to adjust the amount of torque transmitted between the housing 40 and the inner shaft 44.

One end of the drive shaft 108a located on the left rear wheel side and passed through a second opening 200b of the case member 20 is connected to the inner shaft 44 of the left torque coupling 4 out of the pair of torque couplings 4 so as to be non-rotatable relative to the inner shaft 44. One end of the drive shaft 108b located on the right rear wheel side and passed through a third opening 200c of the case member 20 is connected to the inner shaft 44 of the right torque coupling 4 so as to be non-rotatable relative to the inner shaft 44. The housings 40 of the right and left torque couplings 4 and the first member 31 of the input member 3 are connected to each other by a pair of connecting members 50 so as to be non-rotatable relative to each other.

The coils 421 of the torque couplings 4 are supplied with excitation currents from the driving force transmission controller 10. The driving force transmission controller 10 is able to control the driving force to be transmitted from the input member 3 to the left rear wheel 105a by increasing or decreasing the current to be supplied to the coil 421 of the left torque coupling 4. The driving force transmission controller 10 is able to control the driving force to be transmitted from the input member 3 to the right rear wheel 105b by increasing or decreasing the current to be supplied to the coil 421 of the right torque coupling 4.

When the four-wheel-drive vehicle 100 travels straight in a state where the multi-disc clutches 41 of the torque couplings 4 are completely frictionally engaged, the gear ratios of the gears are set such that the rotation speed of the right and left rear wheels 105b, 105a is higher than that of the right and left front wheels 104b, 104a.

The driving force transmission controller 10 includes a control unit 11 and a current output circuit 12, and controls the driving force transmission device 1. The control unit 11 includes, for example, a CPU and memories. The control unit 11 serves as a travelling state determination unit 111, a counter-steering control unit 112, a counter-steering return control unit 113, a normal turning control unit 114, and a driving force transmission control unit 115 when the CPU executes processes on the basis of programs stored in the memories. The current output circuit 12 includes a switching element such as a power transistor. The current output circuit 12 subjects current supplied from a DC power source such as a battery, to switching under PWM control, and then supplies the current to the coils 421 of the driving force transmission device 1.

The travelling state determination unit 111 computes a slip angle β on the basis of the steering angle θs detected by the steering angle sensor 155, a vehicle speed V, and an actual yaw rate γ detected by a yaw rate sensor. The slip angle β means an angle formed between a central axis C extending along the front-rear direction (direction perpendicular to the vehicle-width direction) of the four-wheel-drive vehicle 100, and the actual travelling direction of the four-wheel-drive vehicle 100.

The travelling state determination unit 111 determines whether the travelling state of the four-wheel-drive vehicle 100 is a normal turning state or a counter-steering state on the basis of the slip angle β. The normal turning state is a travelling state in which the turning direction of the four-wheel-drive vehicle 100 coincides with the steered direction of the right and left front wheels 104b, 104a. The counter-steering state is a travelling state in which the turning direction of the four-wheel-drive vehicle 100 is opposite to the steered direction of the right and left front wheels 104b, 104a.

When the travelling state determination unit 111 determines that the travelling state is the normal turning state, the normal turning control unit 114 estimates a target turning radius on the basis of the steering angle θs detected by the steering angle sensor 155 and computes a target slip angle on the basis of the target turning radius, the vehicle speed V, and the accelerator position. The normal turning control unit 114 computes target rotation speeds of the right and left rear wheels 105b, 105a on the basis of the target turning radius, the target slip angle, and the vehicle speed V, and computes driving force transmission command values that are command values of the driving forces to be transmitted to the right and left rear wheels 105b, 105a such that the actual rotation speeds of the right and left rear wheels 105b, 105a are equal to the target rotation speeds.

The target turning radius is an ideal turning radius intended by a driver and is, for example, a turning radius suitable for the curvature of a curve in a road on which the four-wheel-drive vehicle 100 is travelling. The target turning radius may be estimated on the basis of the steering angle θs of the steering wheel 109 detected by the steering angle sensor 155, may be estimated, for example, on the basis of an image captured by an onboard camera, or may be estimated on the basis of map information and current location information acquired from a car navigation system or the like.

The vehicle speed V is acquired on the basis of the rotation speeds of the right and left front wheels 104b, 104a and the right and left rear wheels 105b, 105a detected by the rotation speed sensors 152, 151, 154, 153, and the accelerator position is acquired on the basis of the value detected by the accelerator position sensor 156. The target slip angle is acquired on the basis of the target turning radius, the vehicle speed V, and the accelerator position, for example, with reference to a map.

Figure 3:
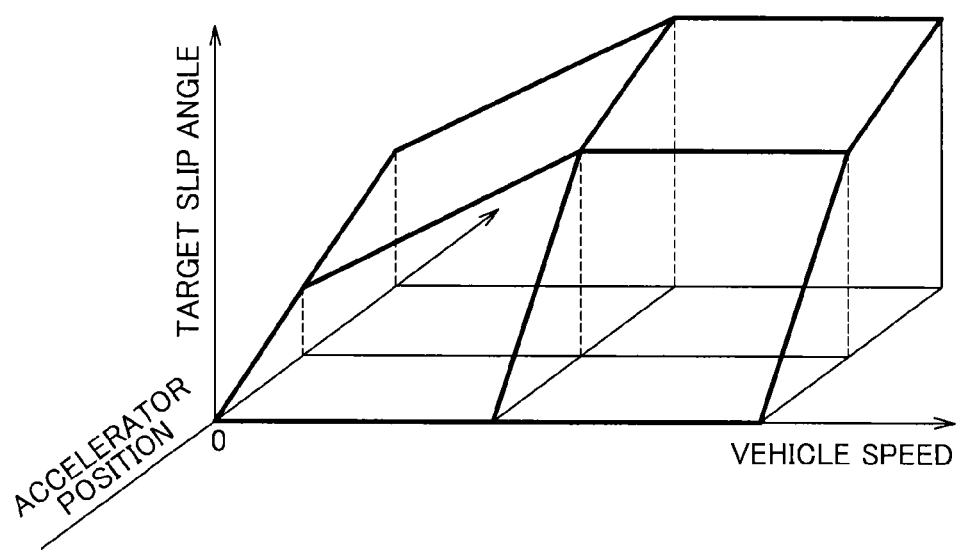
FIG. 3 is a graph illustrating an example of a map indicating the relationship among the vehicle speed, the accelerator position and the target slip angle.

FIG. 3 is a graph illustrating an example of a map indicating the relationship among the vehicle speed V, the accelerator position, and the target slip angle. The control unit 11 stores multiple maps of this type, which correspond to the target turning radii, and the normal turning control unit 114 selects and refers to one map corresponding to the target turning radius out of the multiple maps. These maps are set such that the target slip angle increases as the vehicle speed increases and as the accelerator position increases, for example, as illustrated in FIG. 3. The target slip angle is a slip angle suitable for the four-wheel-drive vehicle 100 to travel along a circular arc with the estimated target turning radius.

The normal turning control unit 114 computes the target rotation speeds of the right and left rear wheels 105b, 105a on the basis of the target slip angle acquired with reference to the map, the target turning radius, and the vehicle speed V. The target rotation speeds are rotation speeds of the right and left rear wheels 105b, 105a when the four-wheel-drive vehicle 100 travels with the target slip angle along the target turning radius at the vehicle speed V.

The normal turning control unit 114 computes the driving force transmission command values such that the actual rotation speeds of the right rear wheel 105b and the left rear wheel 105a approach the target rotation speeds. For example, when the actual rotation speed of the left rear wheel 105a detected by the rotation speed sensor 153 is lower than the target rotation speed of the left rear wheel 105a, the driving force transmission command value for the left torque coupling 4 is set large to increase the rotation speed of the left rear wheel 105*a*. When the actual rotation speed of the left rear wheel 105*a* is higher than the target rotation speed of the left rear wheel 105*a*, the driving force transmission command value for the left torque coupling 4 is set small to decrease the rotation speed of the left rear wheel 105*a*. Note that, in the case of the right rear wheel 105*b* as well as in the case of the left rear wheel 105*a*, the actual rotation speed of the right rear wheel 105*b* is controlled so as to approach the target rotation speed of the right rear wheel 105*b* by increasing or decreasing the driving force transmission command value for the right torque coupling 4.

As a result of this control, the driving force transmitted to the outer wheel in the turning direction, out of the right and left rear wheels 105*b*, 105*a*, is larger than the driving force transmitted to the inner wheel in the turning direction, because the target rotation speed of the outer wheel in the turning direction is higher than the target rotation speed of the inner wheel in the turning direction.

When the travelling state determination unit 111 determines that the travelling state is the counter-steering state, the counter-steering control unit 112 estimates the turning direction and the target turning radius for the four-wheel-drive vehicle 100 on the basis of the slip angle β computed by the travelling state determination unit 111. Then, the counter-steering control unit 112 computes the target rotation speeds of the right and left rear wheels 105*b*, 105*a* on the basis of the estimated turning direction and the estimated target turning radius. Then, the counter-steering control unit 112 computes the driving force transmission command values, which are command values of the driving forces to be transmitted to the right and left rear wheels 105*b*, 105*a*, such that the actual rotation speeds of the right and left rear wheels 105*b*, 105*a* are respectively equal to the target rotation speeds.

The counter-steering control unit 112 computes the target turning radius on the basis of a corrected steering angle θr obtained by correcting the steering angle θs (actual steering angle) detected by the steering angle sensor 155 when the four-wheel-drive vehicle 100 is in the counter-steering state. The corrected steering angle θr is obtained, for example, by subtracting a value, which is obtained by multiplying the slip angle β by a prescribed coefficient k, from the steering angle θs. That is, the corrected steering angle θr is obtained by the following expression.

$$\theta r=\theta s-\beta \times k$$

The prescribed coefficient k is set such that the corrected steering angle θr is equal to the steering angle obtained when the four-wheel-drive vehicle 100 travels in the normal turning state along a track with the actual turning radius of a turn of the four-wheel-drive vehicle 100 during counter-steering. That is, the prescribed coefficient k is set such that, when the four-wheel-drive vehicle 100 travels on a road surface with a prescribed turning radius, the steering angle obtained when the friction coefficient of the road surface is sufficiently high and the four-wheel-drive vehicle 100 turns in the direction in which the front wheels 104*a*, 104*b* are steered is equal to the corrected steering angle θr obtained when the four-wheel-drive vehicle 100 travels on this road surface in the counter-steering state.

The counter-steering control unit 112 estimates the target turning radius on the basis of the corrected steering angle θr. Like the normal turning control unit 114, the counter-steering control unit 112 computes the target slip angle on the basis of the estimated target turning radius, the vehicle speed V, and the accelerator position, computes the target rotation speeds of the right and left rear wheels 105*b*, 105*a* on the basis of the target turning radius, the target slip angle, and the vehicle speed V, and computes the driving force transmission command values for the right and left rear wheels 105*b*, 105*a* such that the actual rotation speeds of the right and left rear wheels 105*b*, 105*a* are equal to the target rotation speeds. As a result, as in the normal turning state, the driving force transmitted to the outer wheel in the turning direction, out of the right and left rear wheels 105*b*, 105*a*, is larger than the driving force transmitted to the inner wheel in the turning direction.

When the steering wheel 109 is turned in a returning direction at a velocity equal to or higher than a prescribed value during counter-steering, the counter-steering return control unit 113 corrects the driving force transmission command values such that the rate of change in each of the driving forces to be transmitted to the right and left rear wheels 105*b*, 105*a* is lower than the rate of change in the steered angle of the front wheels 104*a*, 104*b*. The details of the process executed by the counter-steering return control unit 113 will be described later.

The driving force transmission control unit 115 outputs a control signal for turning on or off the switching element of the current output circuit 12 to the current output circuit 12 such that the driving forces corresponding to the driving force transmission command values computed by the normal turning control unit 114 or the counter-steering control unit 112 or corrected by the counter-steering return control unit 113 are transmitted to the respective wheels. Thus, the driving forces corresponding to the driving force transmission command values are transmitted to the right and left rear wheels 105*b*, 105*a* via the driving force transmission device 1.

Figure 4:
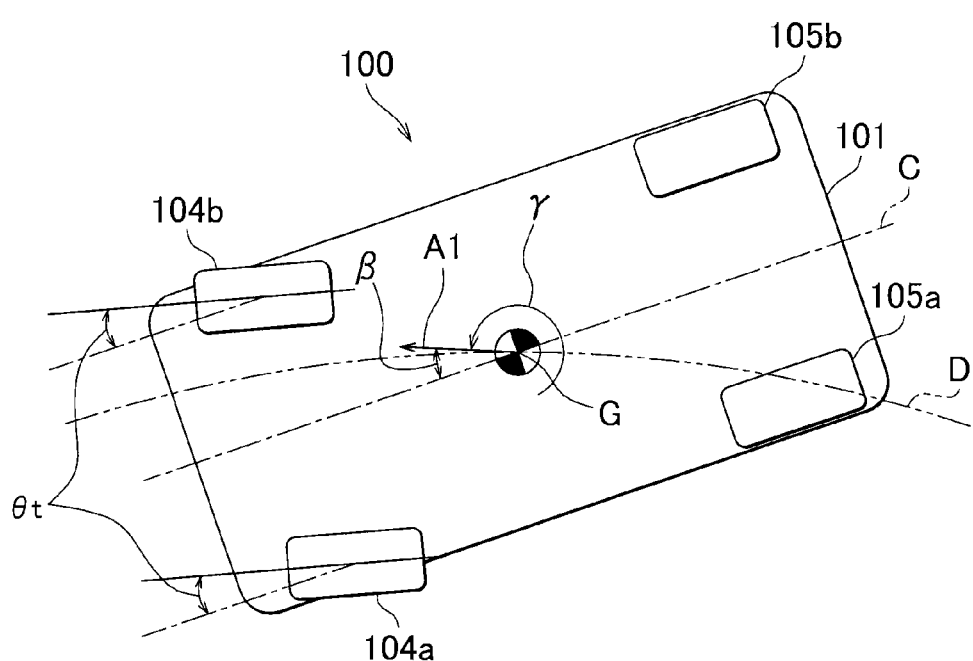
FIG. 4 is an explanatory diagram illustrating the counter-steering state.
Figure 5:
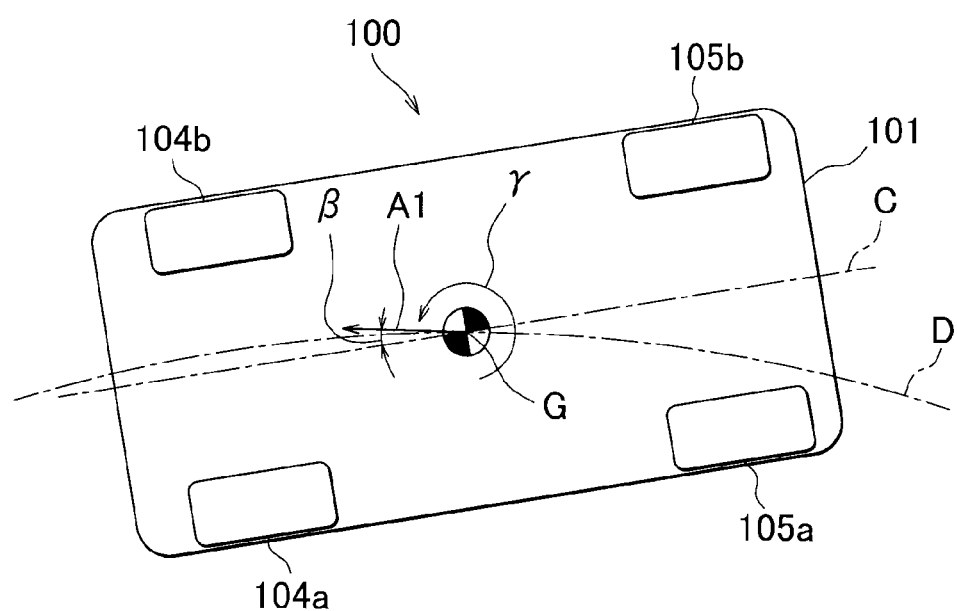
FIG. 5 is an explanatory diagram illustrating the state of transition from the counter-steering state to the normal turning state.
Figure 6:
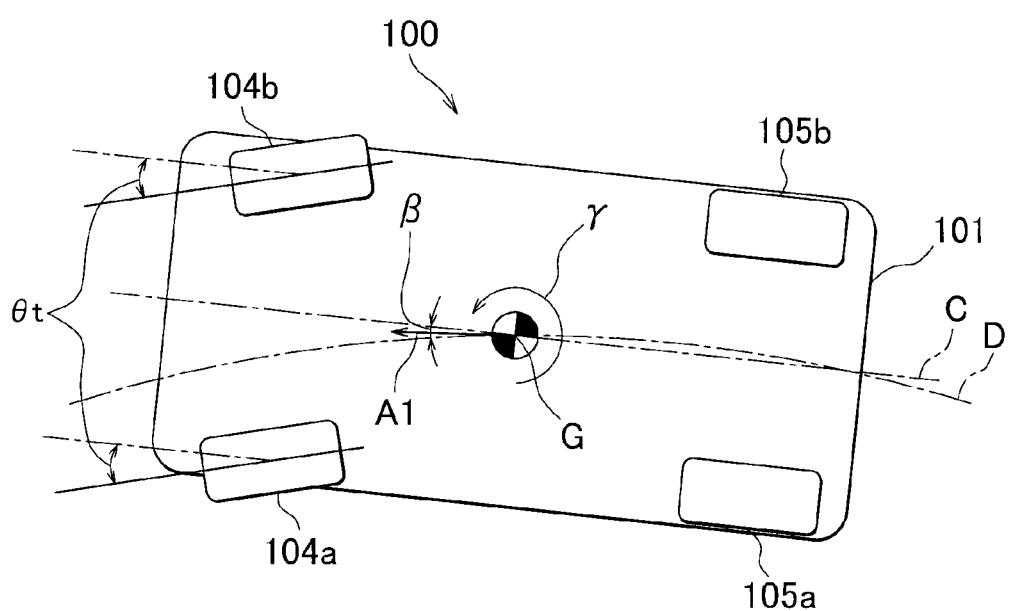
FIG. 6 is an explanatory diagram illustrating the state where the four-wheel-drive vehicle is travelling in the normal turning state.

FIG. 4 is an explanatory diagram illustrating the counter-steering state in which the right and left rear wheels 105*b*, 105*a* slide outward in the turning direction during left-turning of the four-wheel-drive vehicle 100 and the driver performs counter-steering. FIG. 5 is an explanatory diagram illustrating the state where the four-wheel-drive vehicle 100 is being shifted from the counter-steering state to the normal turning state. FIG. 6 is an explanatory diagram illustrating the state where the four-wheel-drive vehicle 100 is travelling in the normal turning state.

In FIG. 4 to FIG. 6, the central axis C extending along the front-rear direction of the four-wheel-drive vehicle 100 is indicated by an alternate long and short dash line and a track D along which the four-wheel-drive vehicle 100 turns is indicated by an alternate long and two short dashes line. In FIG. 4 to FIG. 6, the travelling direction at the center of gravity G of the four-wheel-drive vehicle 100 is denoted by an arrow A1. The slip angle β of the four-wheel-drive vehicle 100 is expressed as an angle formed between the travelling direction A1 and the central axis C.

In the counter-steering state, as illustrated in FIG. 4, the right and left front wheels 104*b*, 104*a* are steered in a direction opposite to the turning direction. The central axis C of the four-wheel-drive vehicle 100 is located inward of the track D in the turning direction, on the side closer to the right and left front wheels 104*b*, 104*a* than the center of gravity G. In the following description, the sign of the slip angle β when the central axis C is located inward of the track D in the turning direction as described above is negative (−).

In this counter-steering state, the counter-steering control unit 112 generates yawing in the turning direction by distributing driving force to the right rear wheel 105*b*, which is an outer wheel in the turning direction, the driving force being larger than the driving force distributed to the left rear wheel 105*a*, which is an inner wheel in the turning direction. In this way, the counter-steering control unit 112 maintains the counter steering state.

In the course of returning the four-wheel-drive vehicle 100 from the counter-steering state, as illustrated in FIG. 5, the steered angle θt of the right and left front wheels 104b, 104a temporarily becomes zero. Even in this state, the central axis C of the four-wheel-drive vehicle 100 is located inward of the track D, on the side closer to the front wheels 104a, 104b than the center of gravity G, but the absolute value of the slip angle β is smaller than that in the state illustrated in FIG. 4.

When the four-wheel-drive vehicle 100 is returned from the counter-steering state and shifted to the normal turning state, as illustrated in FIG. 6, the central axis C of the four-wheel-drive vehicle 100 is located outward of the track D, on the side closer to the front wheels 104a, 104b than the center of gravity G, and the slip angle β has a positive (+) value. In this normal turning state, the normal turning control unit 114 suppresses understeering by transmitting driving force to the right rear wheel 105b, which is an outer wheel in the turning direction, the driving force being larger than the driving force transmitted to the left rear wheel 105a.

Figure 7:
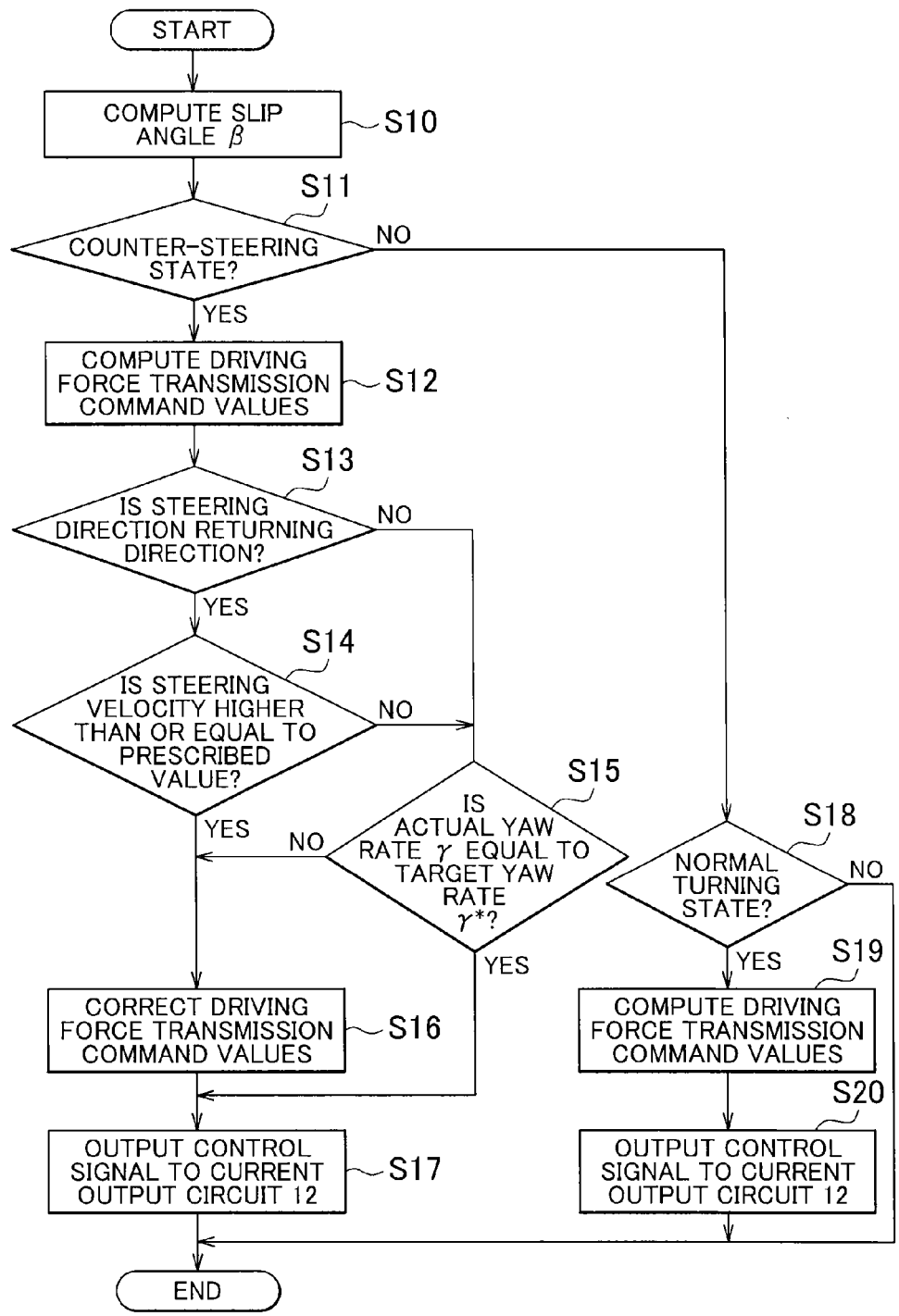
FIG. 7 is a flowchart illustrating a concrete example of the process that is executed by a driving force transmission controller.

FIG. 7 is a flowchart illustrating a concrete example of the process that is executed by the driving force transmission controller 10. The driving force transmission controller 10 repeatedly executes the process illustrated in the flowchart in prescribed control cycles. Out of the steps illustrated in the flowchart, step S10, step S11, and step S18 are processes that are executed by the control unit 11 as the travelling state determination unit 111, steps S12 to S15 are processes that are executed by the control unit 11 as the counter-steering control unit 112, step S16 is a process that is executed by the control unit 11 as the counter-steering return control unit 113, and step S19 is a process that is executed by the control unit 11 as the normal turning control unit 114. Step S17 and step S20 are processes that are executed by the control unit 11 as the driving force transmission control unit 115.

The travelling state determination unit 111 computes the slip angle β on the basis of the steering angle θs of the vehicle detected by the steering angle sensor 155, the vehicle speed V, and the actual yaw rate γ detected by the yaw rate sensor (step S10).

The travelling state determination unit 111 determines whether the travelling state is the counter-steering state on the basis of the value of the slip angle β (step S11). It is determined that the travelling state is the normal turning state when the slip angle β is a positive value. On the other hand, it is determined that the travelling state is the counter-steering state when the slip angle β is a negative value.

When it is determined in step S11 that the travelling state is the counter-steering state (YES in S11), the counter-steering control unit 112 estimates the turning direction of the four-wheel-drive vehicle 100 on the basis of the slip angle β computed by the travelling state determination unit 111. Then, the counter-steering control unit 112 computes the target rotation speeds of the right and left rear wheels 105b, 105a on the basis of the estimated turning direction and the target turning radius. Then, the counter-steering control unit 112 computes the driving force transmission command values that are the command values of the driving forces to be transmitted to the right and left rear wheels 105b, 105a so that the actual rotation speeds of the right and left rear wheels 105b, 105a are equal to the target rotation speeds (step S12).

The counter-steering control unit 112 determines whether the steering direction of the steering wheel 109 is a returning direction (step S13). The returning direction means a direction in which the steering wheel 109, which has been steered outward in the turning direction during starting of the counter-steering, is returned inward in the turning direction. For example, the returning direction during left turning is a direction in which the steering wheel 109 is steered in the counterclockwise direction.

When it is determined that the steering direction of the steering wheel 109 is the returning direction (YES in S13), the counter-steering control unit 112 determines whether the steering velocity of the steering wheel 109 is higher than or equal to a prescribed value (step S14). The prescribed value is a value at which the vehicle behavior may become unstable, for example, when the driving force transmission command values for the right and left rear wheels 105b, 105a are changed at the same rate of change as the rate of change in the steered angle θt of the front wheels 104a, 104b.

When it is determined that the steering velocity of the steering wheel 109 is higher than or equal to the prescribed value (YES in S14), the counter-steering return control unit 113 corrects the driving force transmission command values for the right and left rear wheels 105b, 105a such that the rate of change in each of the driving forces to be transmitted to the right and left rear wheels 105b, 105a is lower than the rate of change in the steered angle θt of the front wheels 104a, 104b (step S16). Specifically, the driving force transmission command values for the right and left rear wheels 105b, 105a in the immediately preceding control cycle is stored. When the rate of change in each of the driving force transmission command values in the present control cycle with respect to a corresponding one of the driving force transmission command values in the immediately preceding control cycle is higher than the rate of change in the steered angle θt of the front wheels 104a, 104b, the driving force transmission command values computed in step S12 are corrected such that the rate of change in each of the driving force transmission command values is lower than the rate of change in the steered angle θt of the front wheels 104a, 104b.

When it is determined that the steering direction of the steering wheel 109 is not the returning direction (NO in S13) or when it is determined that the steering velocity of the steering wheel 109 is neither higher than nor equal to the prescribed value (NO in S14), the counter-steering control unit 112 determines whether the actual yaw rate γ is equal to a yaw rate (hereinafter, referred to as a target yaw rate γ*) corresponding to the steered angle θt and the vehicle speed V (step S15). When it is determined that the actual yaw rate γ is not equal to the target yaw rate γ* (NO in S15), the process in step S16 is executed by the counter-steering return control unit 113.

The correction of the driving force transmission command values in the process in step S16 is made under prescribed conditions (steps S13, S14, and S15) when the travelling state determination unit 111 determines in step S11 that the travelling state is the counter-steering state. Thus, when the driver steers the steering wheel 109 in the returning direction at a steering velocity equal to or higher than the prescribed value, the correction is repeatedly made until the counter-steering state ends. That is, the process of setting the rate of change in each of the torques to be transmitted to the right and left rear wheels 105b, 105a to be lower than the rate of change in the steered angle θt is continuously executed by the counter-steering return control unit 113 until the actual yaw rate γ becomes equal to the yaw rate corresponding to the steered angle θt and the vehicle speed V.

Then, the driving force transmission control unit 115 outputs a control signal for turning on or off the switching element of the current output circuit 12 to the current output circuit 12 such that the driving forces corresponding to the driving force transmission command values corrected in step S16 are transmitted to the right and left rear wheels 105*b*, 105*a* (step S17). Then, the process in the flowchart illustrated in FIG. 7 ends.

When it is determined in step S11 that the travelling state is not the counter-steering state (NO in S11), the travelling state determination unit 111 determines whether the travelling state is the normal turning state (step S18). This determination is made, for example, on the basis of whether the steering angle θs is larger than or equal to a prescribed value.

When it is determined that the four-wheel-drive vehicle 100 is in the normal turning state (YES in S18), the normal turning control unit 114 executes normal turning control of computing the driving force transmission command values on the basis of the target turning radius and the target slip angle as described above (step S19). Then, the driving force transmission control unit 115 outputs a control signal for turning on or off the switching element of the current output circuit 12 to the current output circuit 12 such that the currents corresponding to the driving force transmission command values computed in step S19 are supplied to the coils 421 of the driving force transmission device 1 (step S20). Then, the process in the flowchart illustrated in FIG. 7 ends.

An example of the operation of the four-wheel-drive vehicle 100 when the driving force transmission controller 10 sequentially executes the steps in the flowchart illustrated in FIG. 7 will be described below with reference to FIG. 8 and FIG. 9.

Figure 8:
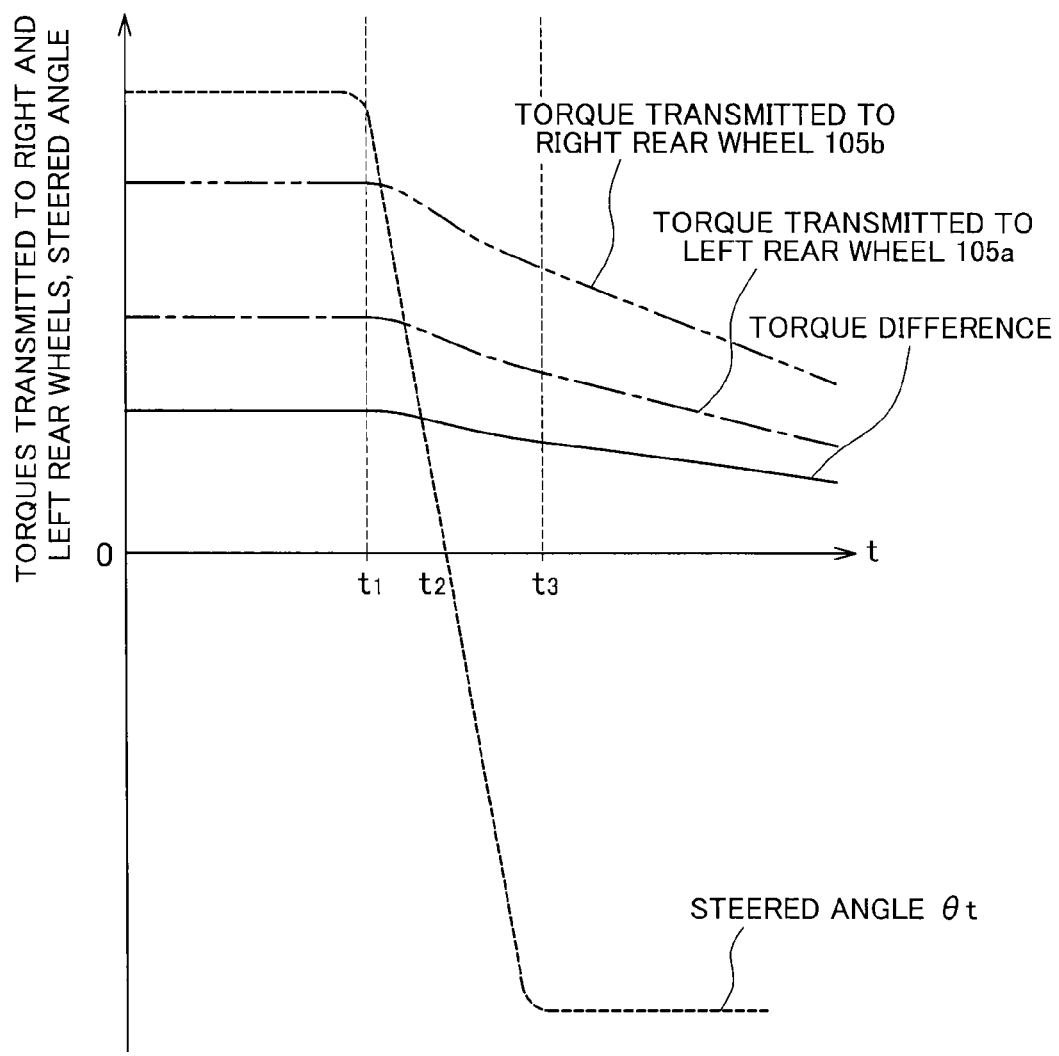
FIG. 8 is a graph illustrating temporal changes in the torque transmission amounts and the steered angle during transition from the counter-steering state to the normal turning state.

FIG. 8 is a graph illustrating the amounts of torques transmitted to the right and left rear wheels 105*b*, 105*a* and the torque difference when the four-wheel-drive vehicle 100 is shifted from the counter-steering state to the normal turning state during left turning with respect to the steered angle θt.

In FIG. 8, the travelling state before time $t_1$ is the counter-steering state in which the steering wheel 109 is steered in a direction opposite to the turning direction, and the travelling state after time $t_3$ is the normal turning state. The period from time $t_1$ to time $t_3$ is a period of transition from the counter-steering state to the normal turning state. The steering wheel 109 is steered in the returning direction after time $t_1$, the steered angle θt becomes zero at time $t_2$, and the steering wheel 109 is further steered in the returning direction.

In the counter-steering state before time $t_1$, the amount of torque transmitted to the right rear wheel 105*b*, which is an outer wheel in the turning direction, is made larger than the amount of torque transmitted to the left rear wheel 105*a*, which is an inner wheel in the turning direction, through the control executed by the counter-steering control unit 112. In the normal turning state after time $t_3$, the amount of torque transmitted to the right rear wheel 105*b*, which is an outer wheel in the turning direction, is made larger than the amount of torque transmitted to the left rear wheel 105*a*, which is an inner wheel in the turning direction, through the control executed by the normal turning control unit 114. In the period from time $t_1$ to time $t_3$, because the rate of change in each of the amounts of torques transmitted to the right rear wheel 105*b* and the left rear wheel 105*a* is made lower than the rate of change in the steered angle θt through the control executed by the counter-steering return control unit 113, the torque difference between the right rear wheel 105*b* and the left rear wheel 105*a* is not zero at time $t_2$ and the state in which the amount of torque transmitted to the right rear wheel 105*b* is larger than the amount of torque transmitted to the left rear wheel 105*a* is maintained at time $t_2$.

Figure 9:
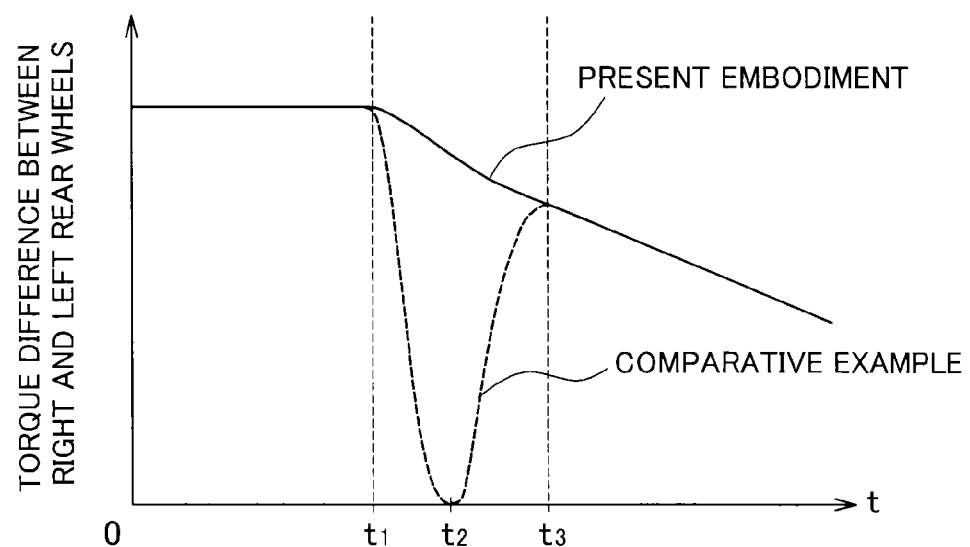
FIG. 9 is a graph illustrating temporal changes in the torque transmission amount difference during transition from the counter-steering state to the normal turning state.

FIG. 9 is a graph illustrating the torque difference between the right and left rear wheels 105*b*, 105*a* when the four-wheel-drive vehicle 100 is shifted from the counter-steering state transitions to the normal turning state in each of the present embodiment and a comparative example.

In FIG. 9, the torque difference between the right and left rear wheels 105*b*, 105*a* when the process by the counter-steering return control unit 113 is not executed is indicated by a broken line as the comparative example. In this comparative example, during transition from the counter-steering state to the normal turning state, the amounts of the torques transmitted to the right and left rear wheels 105*b*, 105*a* become zero with a change in the steered angle θt, and thus the torque difference between the right and left rear wheels 105*b*, 105*a* becomes zero at time $t_2$. In the period from time $t_2$ to time $t_3$, the torque difference between the right and left rear wheels 105*b*, 105*a* gradually increases with a change in the steered angle θt.

As described above, in the comparative example, the torques transmitted to the right and left rear wheels 105*b*, 105*a* and the torque difference between the right and left rear wheels 105*b*, 105*a* vary from time $t_1$ to time $t_3$ more largely than in the present embodiment, and thus the vehicle behavior may be unstable.

According to the above-described embodiment, the following advantageous effects are obtained.

By executing the control of setting the rate of change in each of the amounts of torques transmitted to the right and left rear wheels 105*b*, 105*a* to be lower than the rate of change in the steered angle θt during transition from the counter-steering state to the normal turning state, the amount of change in the torque difference between the right and left rear wheels 105*b*, 105*a* during transition from the counter-steering state to the normal turning state is smaller, for example, as illustrated in FIG. 9, than that in the case where the torque transmission amounts vary depending on the steered angle θt. As a result, it is possible to further stabilize the vehicle behavior.

By maintaining the state in which the amount of torque transmitted to the rear wheel, which is an outer wheel in the turning direction, is larger than the amount of torque transmitted to the rear wheel, which is an inner wheel in the turning direction, it is possible to further reduce the influence of the inversion of the torque difference between right and left rear wheels 105*b*, 105*a* on the vehicle behavior during transition from the counter-steering state to the normal turning state.

By repeatedly executing the process of maintaining the rate of change in each of the amounts of torques transmitted to the right and left rear wheels 105*b*, 105*a* low until the actual yaw rate γ becomes equal to the yaw rate corresponding to the steered angle θt and the vehicle speed V, that is, until the transition to the normal turning state is completed, it is possible to smoothly carry out the transition from the counter-steering state to the normal turning state.

What is claimed is:

1. A driving force transmission controller comprising:
a normal turning control unit that computes driving force transmission command values such that driving force transmitted to an outer wheel in a turning direction, out of right and left rear wheels, is larger than driving force transmitted to an inner wheel in the turning direction, out of the right and left rear wheels, during normal turning in which the turning direction of a vehicle is the same as a steered direction of front wheels;
a counter-steering control unit that estimates the turning direction based on a slip angle and computes the driving force transmission command values such that the driving force transmitted to the outer wheel in the estimated turning direction is larger than the driving force transmitted to the inner wheel in the estimated turning direction during counter-steering in which the turning direction of the vehicle is opposite to the steered direction of the front wheels;

a counter-steering return control unit that corrects the driving force transmission command values such that a rate of change in each of the driving forces transmitted to the right and left rear wheels is lower than a rate of change in a steered angle of the front wheels when a steering wheel is operated in a returning direction at a velocity equal to or higher than a prescribed value during the counter-steering; and a driving force transmission control unit that controls a driving force transmission device to transmit driving force generated by a drive source of the vehicle to the right and left rear wheels such that a ratio between driving force transmitted to the right rear wheel and driving force transmitted to the left rear wheel is variable based on the driving force transmission command values.

2. The driving force transmission controller according to claim 1, wherein the counter-steering return control unit corrects the driving force transmission command values such that a state in which the driving force transmitted to the outer wheel in the turning direction, out of the right and left rear wheels, is larger than the driving force transmitted to the inner wheel in the turning direction is maintained during transition from a control state achieved by the counter-steering control unit to a control state achieved by the normal turning control unit.

3. The driving force transmission controller according to claim 1, wherein the counter-steering return control unit continues to execute a process of correcting the driving force transmission command values such that the rate of change in each of the driving forces transmitted to the right and left rear wheels is lower than the rate of change in the steered angle of the front wheels until an actual yaw rate of the vehicle becomes equal to a yaw rate corresponding to the steered angle of the front wheels and a vehicle speed.

4. The driving force transmission controller according to claim 2, wherein the counter-steering return control unit continues to execute a process of correcting the driving force transmission command values such that the rate of change in each of the driving forces transmitted to the right and left rear wheels is lower than the rate of change in the steered angle of the front wheels until an actual yaw rate of the vehicle becomes equal to a yaw rate corresponding to the steered angle of the front wheels and a vehicle speed.

5. A vehicle control method using a driving force transmission controller that controls a driving force transmission device that transmits driving force generated by a drive source of a vehicle to right and left rear wheels such that a ratio between driving force transmitted to the right rear wheel and driving force transmitted to the left rear wheel is variable, the vehicle control method comprising:

computing driving force transmission command values such that driving force transmitted to an outer wheel in a turning direction, out of the right and left rear wheels, is larger than driving force transmitted to an inner wheel in the turning direction, out of the right and left rear wheels, during normal turning in which the turning direction of the vehicle is the same as a steered direction of front wheels;

estimating the turning direction based on a slip angle and computing the driving force transmission command values such that the driving force transmitted to the outer wheel in the estimated turning direction is larger than the driving force transmitted to the inner wheel in the turning direction during counter-steering in which the turning direction of the vehicle is opposite to the steered direction of the front wheels;

correcting the driving force transmission command values such that a rate of change in each of the driving forces transmitted to the right and left rear wheels is lower than a rate of change in a steered angle of the front wheels when a steering wheel is operated in a returning direction at a velocity equal to or higher than a prescribed value during counter-steering; and controlling the driving force transmission device based on the driving force transmission command values.

* * * * *